United States Patent [19]

Mächler et al.

[11] Patent Number: 4,838,645
[45] Date of Patent: Jun. 13, 1989

[54] REFLECTING DIFFRACTION GRATING

[75] Inventors: Meinrad Mächler, Ellwangen; Reinhold Bittner, Mögglingen; Richard Sachse, Königsbronn; Harry Schlemmer, Aalen, all of Fed. Rep. of Germany

[73] Assignee: Carl-Zeiss-Stiftung, Heidenheim, Fed. Rep. of Germany

[21] Appl. No.: 896,134

[22] Filed: Aug. 12, 1986

[30] Foreign Application Priority Data

Aug. 13, 1985 [DE] Fed. Rep. of Germany ....... 3528947

[51] Int. Cl.$^4$ ............................ G02B 5/18; G02B 6/34
[52] U.S. Cl. ............................ 350/162.23; 350/96.19; 350/162.22; 356/305
[58] Field of Search ...................... 350/162.23, 162.22, 350/96.19; 356/305

[56] References Cited

U.S. PATENT DOCUMENTS

| 3,674,335 | 7/1972 | Ashkin et al. | 350/96.19 |
| 4,335,933 | 6/1982 | Palmer | 350/96.19 |
| 4,475,792 | 10/1984 | Sica, Jr. | 356/305 |
| 4,571,024 | 2/1986 | Husbands | 350/96.19 |
| 4,622,662 | 11/1986 | Laude et al. | 350/96.19 |
| 4,643,519 | 2/1987 | Bussard et al. | 350/96.19 |
| 4,739,501 | 4/1988 | Fussgänger | 350/96.19 |
| 4,744,618 | 5/1988 | Mahlein | 350/96.19 |

FOREIGN PATENT DOCUMENTS 2657090 6/1977 Fed. Rep. of Germany .
2165061 4/1986 United Kingdom .

OTHER PUBLICATIONS

Halliday and Resnick, "Total Internal Reflection", Fundamentals of Physics, 1981, pp. 693–694.

Primary Examiner—Rodney B. Bovernick
Assistant Examiner—Terry S. Callaghan
Attorney, Agent, or Firm—Walter Ottesen

[57] ABSTRACT

An unmetallized grating is mounted on an optically transparent body is subjected to radiation which passes through the body and strikes the flanks of the grating grooves at an angle that is larger than the critical angle of the total reflection.

16 Claims, 3 Drawing Sheets

REFLECTING DIFFRACTION GRATING

FIELD OF THE INVENTION

The invention relates to a reflecting diffraction grating in which the grating ruling is applied with its reflecting side upon one face of an optically transparent body.

BACKGROUND OF THE INVENTION

Reflecting diffraction gratings have been known for a long time. To improve their efficiency, or in other words their reflectively within an intended wavelength range (usually for the first order), the grooves are provided with a predetermined profile, that is a so-called blaze. The gratings are usually also provided with a metallized surface (for example, aluminum, gold, or platinum) on their front face, which is protected by an $MgF_2$ layer as may be required. The reflectivity of the known gratings, despite the blaze and despite the metallizing, is markedly below 100%, often considerably below it. For many applications, in which maximally high intensity is important, this is a great disadvantage.

A method of producing diffraction gratings having an asymmetrical groove profile is known, for instance from German Pat. No. 2,118,674. A diffraction grating is also known from U.S. Pat. No. 4,475,792 which is mounted on the reflecting surface of an optical prism. This arrangement does increase the resolution by the factor n, where n is the index of refraction of the optical prism. However, it is disadvantageous that the reflectivity of this grating (even when it is metallized) is less than in conventional surface gratings, because the difference in the indices of refraction between metal and the optical material of the prism is less than that between metal and air. As a result, this known grating has even poorer efficiency than the normal reflecting diffraction grating.

SUMMARY OF THE INVENTION

It is an object of the invention to provide a reflecting diffraction grating having the highest possible efficiency.

This object is attained, in a reflecting diffraction grating of the type referred to above, by providing that the angle at which the light strikes the flanks of the grating grooves is larger than the critical angle of total reflection.

The critical angle $\phi_T$ of total reflection is given by the equation $\sin \phi_T = 1/n$, where n is the index of refraction of the optically transparent material making up the steps of the grating when the reflective surface borders on air.

The grating can, for example, be produced by known techniques as a replica in an epoxy resin film on a glass block. However, the grating may also be produced together with the optically transparent body in the form of a casting made of a plastic; CR 39, for example, is suitable for this purpose. It is also possible to produce the grating ruling in the form of an etched structure directly on a suitable substrate of optically transparent material, as described in examined German patent application DE-AS No. 26 57 090, for example. A suitable substrate in this case is quartz glass, for example. Other advantageous embodiments of the invention will become apparent from the ensuring description.

A particular advantage of the invention is that the usual metallizing is dispensed with. Care need only be taken that the back of the grating cannot become dirty, and this can easily be done by providing a mechanical covering spaced slightly apart therefrom.

BRIEF DESCRIPTION OF THE DRAWINGS

The invention will now be described with reference to the drawings wherein:

FIG. 3b is an end elevation view taken in the direction of line IIIb—IIIb of FIG. 3a;

DESCRIPTION OF THE PREFERRED EMBODIMENTS OF THE INVENTION

Figure 1:
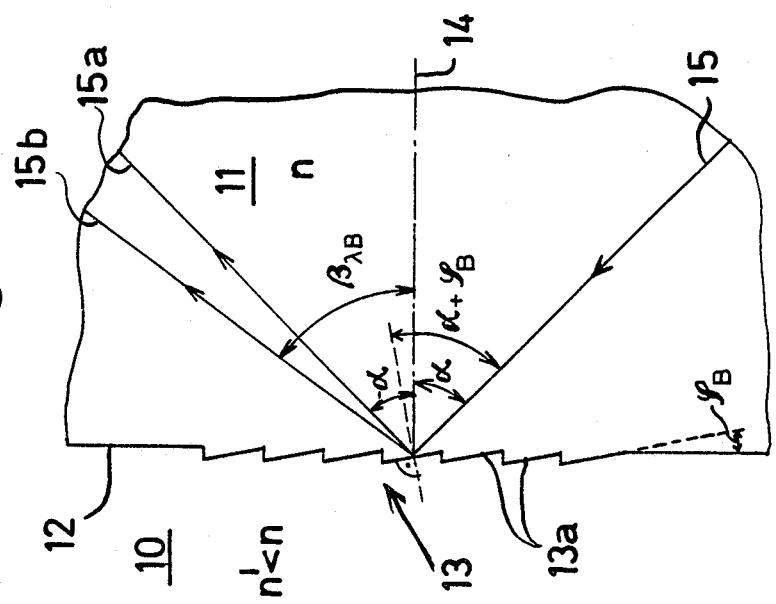
FIG. 1 is a schematic illustrating the use of a reflection grating in which the total reflection is utilized.
Figure 3A:
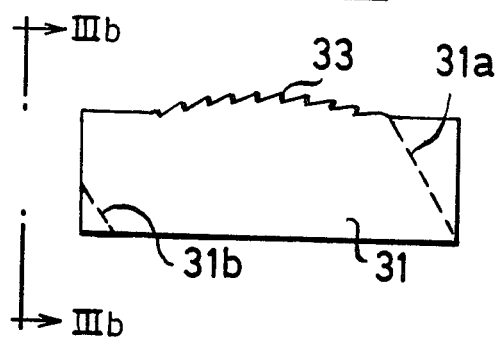
FIG. 3a is a side elevation view of another embodiment of the invention wherein a concave diffraction grating and a transparent body are made together as a casting.
Figure 3B:
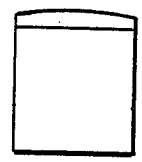
Figure 3C:
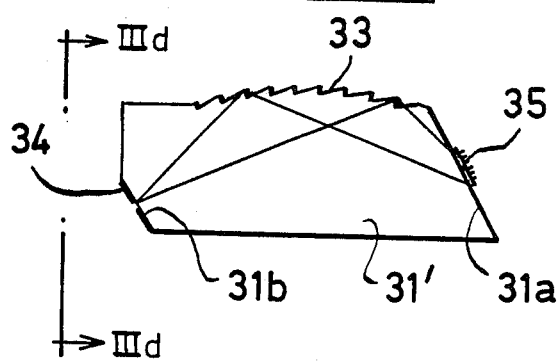
FIG. 3c is a side elevation view of the embodiment of FIG. 3a supplemented to provide a spectrometer.
Figure 3D:
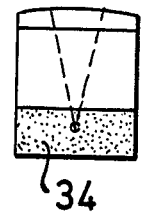
FIG. 3d is an end elevation view taken in the direction of line IIId—IIId of FIG. 3c.

In FIG. 1, reference numeral 11 identifies an optically transparent material having the index of refraction n. The reflective surface 12 has the grating structure 13 and the blaze angle $\rho_B$ and borders on the air 10. The index of refraction n' of air is smaller than n and equal to 1. Total reflection therefore takes place at the grating 13 if there is a drop below the critical angle $\phi_T$ which follows from the equation $$\sin \phi_T = 1/n.$$

An incident ray of light 15 at the angle $\alpha$ to the normal 14 is reflected in the so-called zero order as a "white" ray of light 15a at the angle $-\alpha$. The wavelength $\lambda_B$, for which the blaze effect is for instance required in the first order, appears at the angle $$\beta_{\lambda B} = -(\alpha - 2\rho_B)$$

as ray 15b.

An incident ray of light 15 at the angle $\alpha$ to the normal 14 strikes the flanks 13a of the grating grooves at the angle $$\phi = \alpha + \rho_B.$$

If this angle $\phi$ is equal to or greater than the critical angle of total reflection $\phi_T$, which is given by the equation $$\sin \phi_T = 1/n,$$

then total reflection occurs. In this case, the reflectivity is defined as $$R_T = 1.$$

In this connection, reference can be made, for example, to "Optik" by Born, page 41, published by Springer Verlag (1972). The efficiency of a reflection grating operated in total reflection is therefore now dependent only on the spectral transparency of the optically transparent material 11 and on the shading produced by the groove profile. The spectral transparency can always be selected favorably by selecting a suitable material, so that reflecting diffraction gratings can be produced to have a very high efficiency by utilizing the above-described exploitation of the total reflection.

Figure 2:
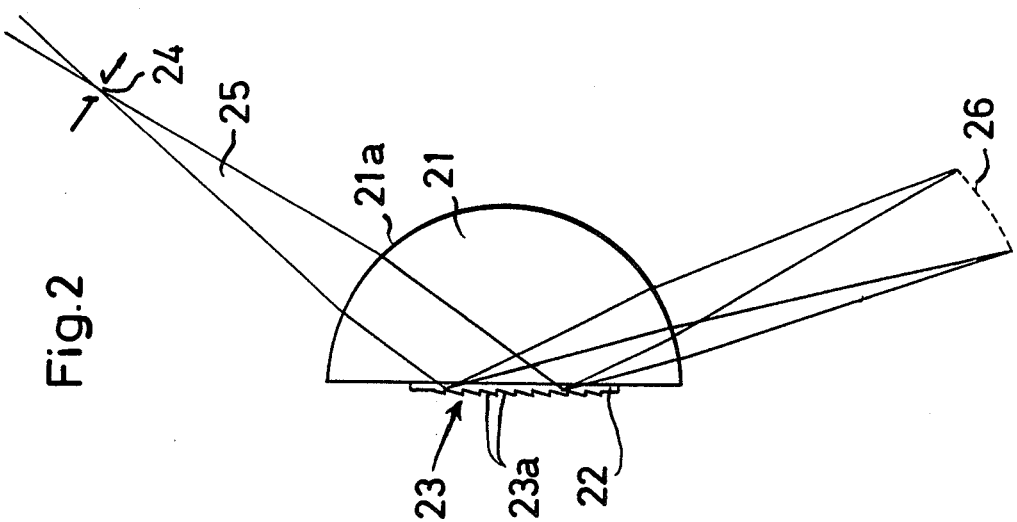
FIG. 2 shows an exemplary embodiment with a replica of the grating.

In FIG. 2 an embodiment is shown in which a grating 23 is copied onto a hemisphere 21. The hemisphere 21 is of glass, for example of ZKN 7 manufactured by Schott. Between this hemisphere and the grating grooves 23a, there is a thin layer 22 of epoxy resin from the copying process. For the critical angle $\phi_T$ beyond which total reflection occurs, this epoxy resin layer is definitive, and thus so is its index of refraction; this index of refraction is greater than that of the glass ZKN 7.

The hemisphere 21 has imaging properties as will now be described. After its first passage through the spherical surface 21a, the beam of light 25 coming from the entry slit 24 strikes the grating 23 in the form of a bundle of parallel rays and after diffraction at the grating, upon its second passage through the spherical surface 21a, the beam is again focused so that a spectrum is produced on the surface 26.

The described arrangement may be carried out with the following data, as an example:
hemisphere of ZKN 7; $n_d = 1.508$; $\phi_T = 41.54°$
copying material, epoxy resin; $n_d = 1.614$; $\phi_T = 38.29°$
hemisphere radius, $r = 29$ mm
groove density 305 L/mm; blaze angle $\rho_B = 3.9257°$
angle of incidence $\alpha = -55°$
blaze wavelength in first order, $\lambda_B = 382$ nm
spectrum lengths from 405 to 706 mm $= 15$ mm.

The described embodiment also shows how a presumed disadvantage of the reflecting diffraction grating according to the invention can be turned into an advantage. Because of the transparent body disposed in front of the grating, reflection losses would occur upon entry into the transparent body, if the grating were used as shown in U.S. Pat. No. 4,475,792. However, if the transparent body is at the same time configured as an imaging element as in FIG. 2, then the otherwise-required imaging element having two boundary faces (or one reflection surface) is dispensed with. Overall, the reflection losses are thus reduced as compared with conventional arrangements, by providing imaging surfaces of the transparent body both in front of and following the grating.

In FIG. 3, a different embodiment is shown, in which a concave grating 33 is produced together with the transparent body 31 as a casting. CR 39 is an example of a suitable material which can be used and is manufactured by Pittsburgh Plate Glass. The casting technique requires a shape of the transparent body 31 that often does not suit the intended later application. In the embodiment shown, the faces 31a and 31b are therefore produced by subsequent processing, so that the transparent body 31' of the shape shown in FIGS. 3c and 3d is produced. An entry slit 34 is cemented onto the face 31b and a diode array 35 is cemented onto the face 31a.

This provides an extremely compact and small-sized spectrometer.

Figure 4A:
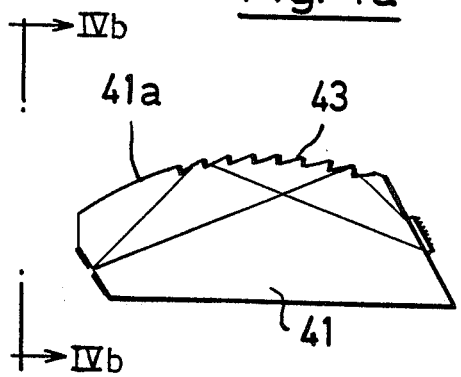
FIG. 4a is a side elevation view of a spectrometer corresponding to that shown in FIGS. 3c and 3d except that here the body of the spectrometer is made from glass by conventional processing techniques and wherein the grating is etched.
Figure 4B:
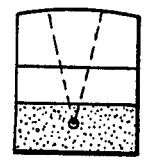
FIG. 4b is an end elevation view taken in the direction of line IVb—IVb of FIG. 4a; and, FIG. 5 is a side elevation view of the spectrometer corresponding to that shown in FIG. 4a except that a first set of optical fibers are provided in lieu of the entry slit and a second set of optical fibers are provided in lieu of the diode array.

The same spectrometer is shown in FIGS. 4a and 4b; only the external shape is slightly different which is caused by a different manufacturing process. In this embodiment, the transparent body 41 has been produced by conventional processing from glass, from example quartz glass, and the grating 43 is then cut into the concave surface 41a by ion etching.

In all the embodiments, it is possible to dispose or cement on optical fibers in place of the entry slit. It is likewise possible, in the spectral plane 26 or in place of the diode arrays, to use optical fibers for transmitting the radiation of predetermined wavelength ranges.

Figure 5:
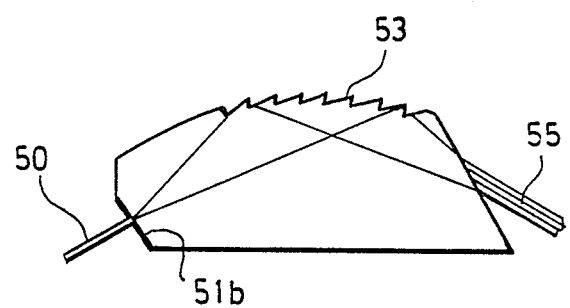

Thus, as shown in FIG. 5, a first set of optical fibers 50 can be mounted on face 51b for directing a bundle of light rays onto the flanks defined by the concave grating 53. A second set of fibers 55 can be provided for directing away the bundle of light rays after the latter are reflected at these flanks.

It is understood that the foregoing description is that of the preferred embodiments of the invention and that various changes and modifications may be made thereto without departing from the spirit and scope of the invention as defined in the appended claims.

What is claimed is:

1. An optical device comprising:
an optically transparent body having an index of refraction n and defining a surface;
diffraction means disposed on said surface and including a plurality of grooves having respective flanks so as to cause said surface to be a blazed surface; and,
light directing means for directing a bundle of light rays through said optically transparent body onto said flanks so as to cause the same to strike said flanks at an angle $(\alpha + \rho_B)$ greater than the critical angle $$\phi_T = \arcsin(1/n)$$

whereby said rays are totally reflected from said flanks.

2. The optical device of claim 1, said body and said diffracting means being formed as a unitary casting from optically transparent plastic.

3. The optical device of claim 2, said plastic being CR 39.

4. The optical device of claim 1, said transparent body being an optically transparent carrier defining said surface, said grooves being etched into said surface.

5. The optical device of claim 4, said transparent carrier being made of quartz glass.

6. The optical device of claim 1, said body being configured to define an optical surface for collimating said bundle of light rays onto said flanks.

7. The optical device of claim 1, said body being configured to have an optical surface for focusing the bundle of rays of light reflected from said flanks onto a surface.

8. The optical device of claim 1, said light directing means including a first set of optical fibers for directing the bundle of light rays to said flanks and a second set of optical fibers for directing away said bundle of light rays after the latter are reflected at said flanks.

9. The optical device of claim 1, said transparent body defining a second surface; and, said light directing means including an entry slit attached to said second surface for admitting said bundle of light rays.

10. The optical device of claim 9, said transparent body defining a third surface in the path of the rays of said bundle reflected from said flanks; and, receiver means attached to said third surface for receiving the reflected rays whereby said entry slit, said diffracting means and said receiver means conjointly define a compact spectrometer.

11. An optical device comprising:
an optically transparent body defining a surface, said body being a block made of glass and having an index of refraction n';
diffraction means disposed on said surface and including a plurality of grooves having respective flanks so as to cause said surface to be a blazed surface;
said diffraction means including a thin film of epoxy resin having an index of refraction n'' and disposed on said surface;
said plurality of grooves being formed as an impression in said film; and,
light directing means for directing a bundle of light rays through said optically transparent body onto said flanks so as to cause the same to strike said flanks at an angle $(\alpha + \rho_B)$ greater than the critical angle $$\phi_T = \arcsin(1/n'')$$

whereby said rays are totally reflected from said flanks.

12. A reflecting diffraction grating comprising:
an optically transparent body having an index of refraction n and defining a first surface region;
diffraction means disposed on said first surface region and including a plurality of grooves having respective flanks so as to cause said first surface region to be a blazed surface;
light directing means for directing a bundle of light rays through said optically transparent body toward a second surface region of said body;
first imaging means formed at said second surface region to receive said bundle of light rays and collimate the same onto said flanks so as to cause said rays to strike said flanks at an angle $(\alpha + \rho_B)$ greater than the critical angle $$\phi_T = \arcsin(1/n)$$

whereby said rays are totally reflected from said flanks; and,
second imaging means formed at a third surface region of said body for focusing said rays reflected from said flanks onto surface means spaced from said body so that a spectrum is produced on said surface means.

13. An optical device comprising:
an optically transparent body having an index of refraction n and defining an outwardly protruding curved first surface region;
concave diffraction means disposed on said first surface region and including a plurality of grooves having respective flanks so as to cause said first surface region to be a blazed surface; and,
light directing means disposed at a second surface region of said body for directing a bundle of light rays through said optically transparent body onto said flanks so as to cause the same to strike said flanks at an angle $(\alpha + \rho_B)$ greater than the critical angle $$\phi_T = \arcsin(1/n)$$

whereby said rays are totally reflected from said flanks.

14. The optical device of claim 13, said optically transparent body having a third surface region formed thereon in the path of said rays reflected from said flanks; and, receiver means attached to said third surface region for receiving said reflected rays.

15. The optical device of claim 14, said light directing means being entry slit means cemented onto said second surface region; and, said receiver means being a diode array cemented onto said third surface region.

16. The optical device of claim 14, said light directing means being first optical fiber means cemented onto said second surface region; and, said receiver means being second optical fiber means cemented onto said third surface region.

* * * * *

UNITED STATES PATENT AND TRADEMARK OFFICE
CERTIFICATE OF CORRECTION

PATENT NO. : 4,838,645

DATED : June 13, 1989

INVENTOR(S) : Meinrad Mächler, Reinhold Bittner, Richard Sachse and Harry Schlemmer It is certified that error appears in the above-identified patent and that said Letters Patent is hereby corrected as shown below:

On the cover page, the second line under "ABSTRACT", insert -- and -- between "body" and "is".

In column 1, line 13: delete "reflectively" and substitute -- reflectivity -- therefor.

In column 1, line 65: delete "ensuring" and substitute -- ensuing -- therefor.

In column 2, line 40: delete "angle $\rho_B$" and substitute -- angle $\mathcal{J}_B$ -- therefor.

In column 2, line 54: delete "$\beta_{\lambda B} = -(\alpha - 2\rho_B)$" and substitute -- $\beta_{\lambda B} = -(\alpha - 2\mathcal{J}_B)$ -- therefor.

In column 2, line 62: delete "$\phi = \alpha + \rho_B$" and substitute -- $\phi = \alpha + \mathcal{J}_B$ -- therefor.

In column 3, line 38: delete "angle $\rho_B = 3.9257°$" and substitute -- angle $\mathcal{J}_B = 3.9257°$ -- therefor.

In column 4, line 7: delete "from" and substitute -- for -- therefor.

UNITED STATES PATENT AND TRADEMARK OFFICE
CERTIFICATE OF CORRECTION

PATENT NO. : 4,838,645

DATED : June 13, 1989

INVENTOR(S) : Meinrad Machler, Reinhold Bittner, Richard Sachse and Harry Schlemmer It is certified that error appears in the above-identified patent and that said Letters Patent is hereby corrected as shown below:

In column 4, line 22: delete "inventionand" and substitute -- invention and -- therefor.

In column 4, line 38: delete "angle $(\alpha + \rho_B)$" and substitute -- angle $(\alpha + \jmath_B)$ -- therefor.

In column 5, line 26: delete "angle $(\alpha + \rho_B)$" and substitute -- angle $(\alpha + \jmath_B)$ -- therefor.

In column 5, line 33: delete "12. A reflecting diffraction grating" and substitute -- 12. An optical device -- therefor.

In column 6, line 1: delete "angle $(\alpha + \rho_B)$" and substitute -- angle $(\alpha + \jmath_B)$ -- therefor.

In column 6, line 25: delete "angle $(\alpha + \rho_B)$" and substitute -- angle $(\alpha + \jmath_B)$ -- therefor.

Signed and Sealed this

Twentieth Day of March, 1990

Attest:

JEFFREY M. SAMUELS

Attesting Officer

Acting Commissioner of Patents and Trademarks